July 19, 1966     P. H. ROBERTS ET AL     3,261,573
AIRCRAFT CONTROL SYSTEM
Filed Dec. 14, 1964     2 Sheets-Sheet 2
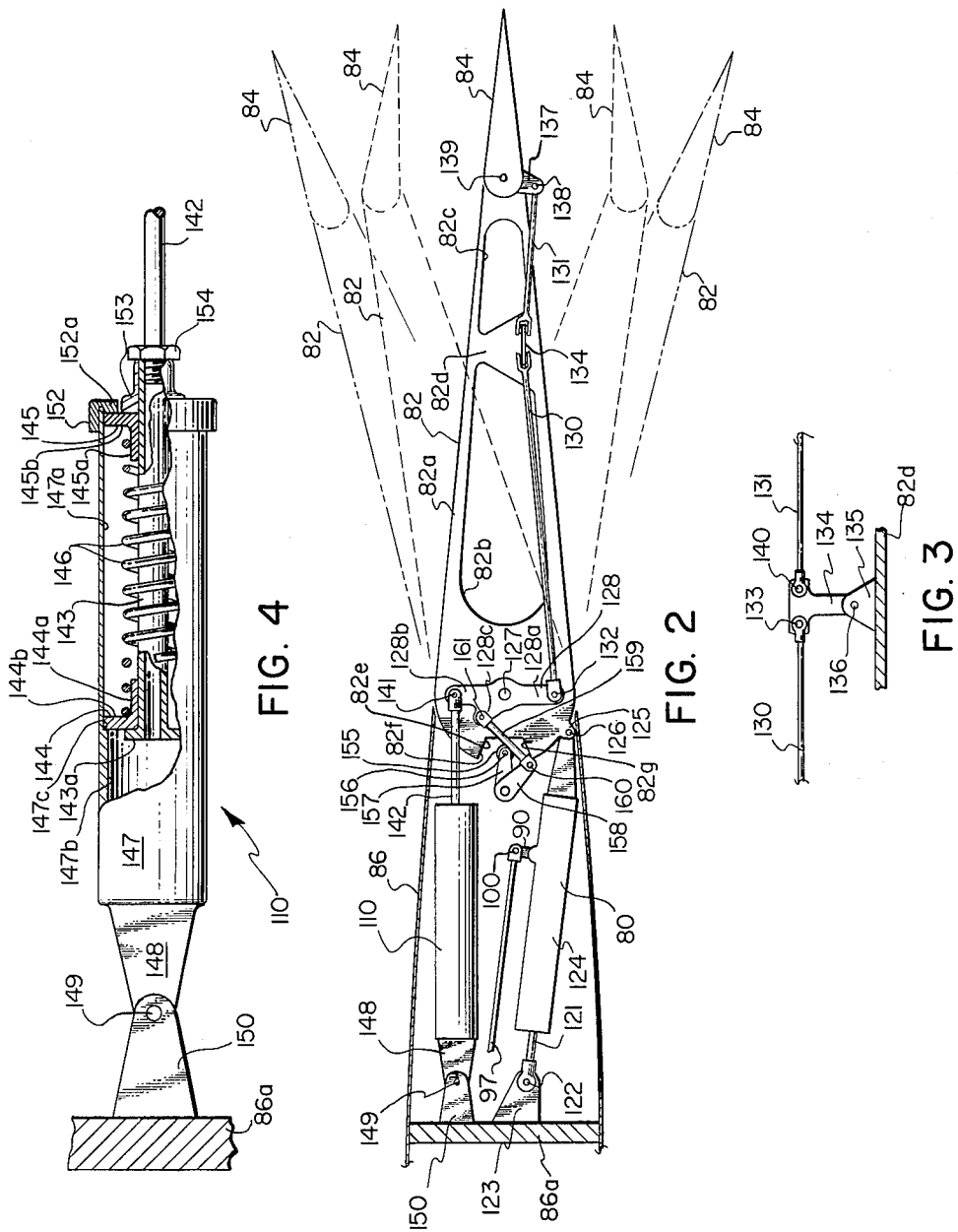
INVENTOR.
WILLIAM R. SNOOK, JR.
PHILLIP H. ROBERTS
BY
ATTORNEY

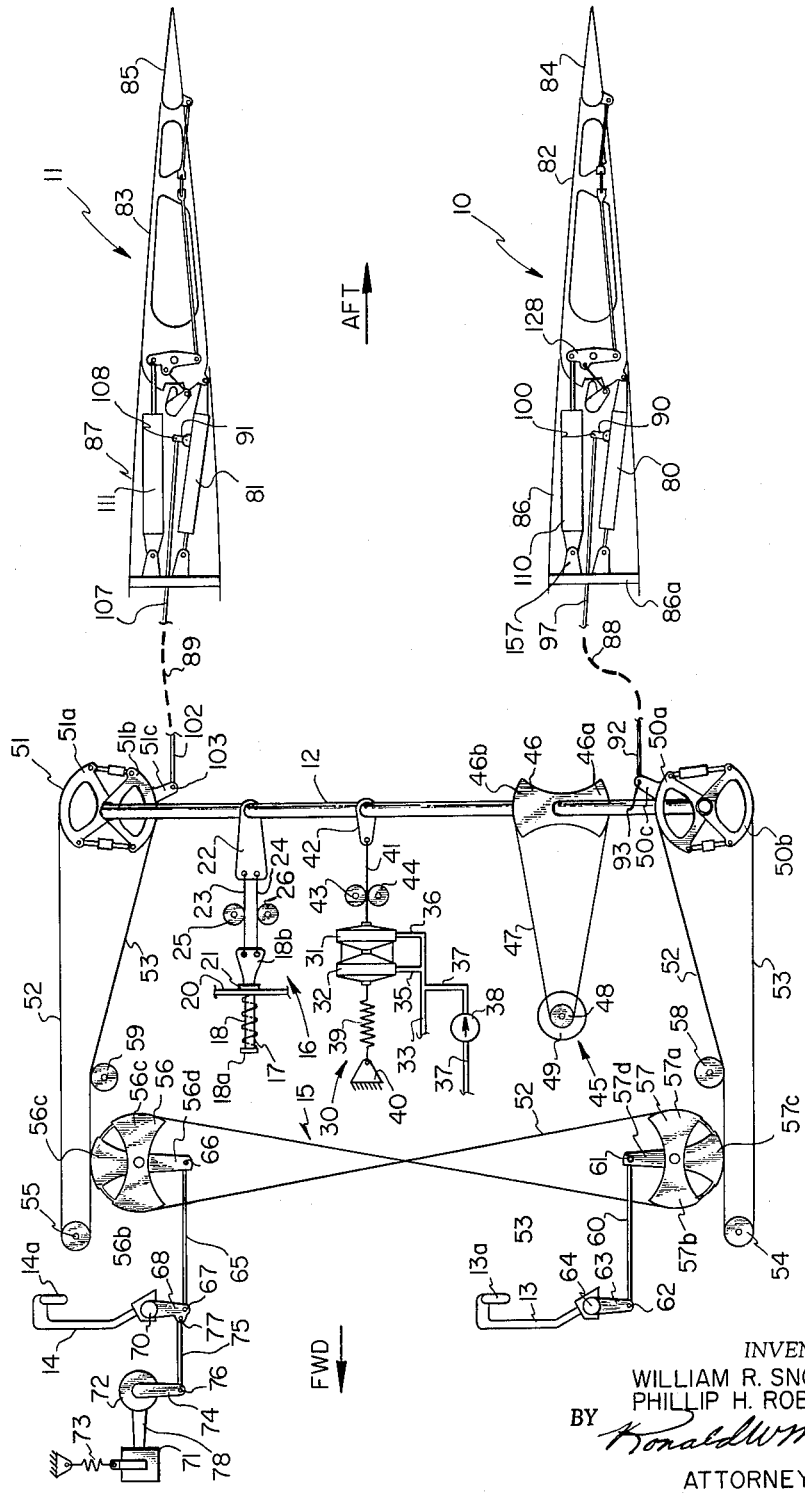

United States Patent Office 3,261,573
Patented July 19, 1966

3,261,573
AIRCRAFT CONTROL SYSTEM
Phillip H. Roberts, New Orleans, La., and William R. Snook, Jr., Wichita, Kans., assignors to The Boeing Company, Seattle, Wash., a corporation of Delaware
Filed Dec. 14, 1964, Ser. No. 418,119
6 Claims. (Cl. 244—83)

This invention relates to an aircraft control system and, more particularly, to a control system adaptable for an aircraft having a wide range of speed.

One of the objects of this invention is the provision of a new and improved aircraft control system for the longitudinal pitch control of the aircraft.

Another object of this invention is the provision of a new and improved control system for controlling the elevators and elevator tabs of an aircraft relative to the horizontal stabilizers thereof.

Another object of this invention is the provision of a pilot operated control system for an aircraft in which the variation of column force per incremental change in normal acceleration is minimized though there may be large variations in gross weight, shift of center of gravity, and permissible operational air speed.

A still further object of this invention is the provision of an elevator control system as set forth in the preceding object in which the feel forces experienced by a pilot during an assigned mission is limited to the practical minimum for the purpose of reducing pilot fatigue.

Yet another object of this invention is the provision of a novel pilot operated elevator control system that can power, for example, a twenty-five percent chord elevator through plus or minus twenty degrees of travel.

Another object of this invention is the provision of a novel aircraft pitch control system as set forth in the preceding object that has a trim tab faired with an elevator as follows: As the elevator travels from zero degrees to fourteen degrees total elevation up relative to a stabilizer, a tab may travel in a linear path from zero degrees to twenty degrees total elevation down relative to the elevator; further elevation travel from fourteen degrees to twenty degrees forces the tab to travel a total elevation down of as much as twenty degrees to the faired position; and the tab travel caused by elevator travel to twenty degrees total elevation down is symmetrical to the schedule for the up elevator travel.

A still further object of this invention is the provision of a pilot operated elevator control system in which the maximum obtainable elevator travel varies with air speed, for example the total elevator travel is preferably approximately twenty degrees, sixteen and four-tenths degrees, and nine and five-tenths degrees for two hundred, three hundred, and four hundred knots air speed, respectively.

A still further object of this invention is the provision of an elevator control system as set forth in the preceding object having a dual hydraulic system operating in such a manner that when the one hydraulic system fails, the elevator travel is not cut in half, but is preferably, for example, approximately sixteen and eight-tenths degrees, fourteen and eight-tenths degrees, and seven and two-tenths degrees, respectively, for two hundred, three hundred, and four hundred knots air speed, respectively.

The invention further resides in certain novel features of construction, combinations, and arrangements of parts and further objects and advantages of the invention will be apparent to those skilled in the art to which it pertains from the following description of the present preferred embodiment thereof described with reference to the accompanying drawings, which form a part of this specification, wherein the same reference numerals indicate corresponding parts throughout the several views, and in which:

FIG. 1 is a schematic layout of an elevator control system embodying the invention;

FIG. 2 is an enlarged view of an horizontal stabilizer, elevator, and elevator tab assembly showing in hidden outline the relationship of an elevator tab relative to an elevator in various angles of inclination and declination thereof;

FIG. 3 is an enlarged cross-sectional view of the horizontal stabilizer, elevator, and tab assembly showing details of the mechanical linkage controlling the conjoint operation of the elevator and elevator tab of FIG. 2; and FIG. 4 is an enlarged detailed drawing of a spring cartridge assembly with parts broken away and in cross-section.

It is to be understood that the invention is not limited to the details of construction and the arrangements of parts shown in the drawings and hereafter described in detail, but is capable of being otherwise embodied and of being practiced and carried out in various ways. It is to be further understood that the terminology employed herein is for the purpose of description and there is no intention to herein limit the invention beyond the requirements of the prior art.

Referring to FIG. 1, reference numeral 10 indicates generally a left-hand elevator pitch control means and reference numeral 11 indicates generally a right-hand elevator control means. Both of these elevator pitch control means 10 and 11 are coplanar and connected together within a fuselage, not shown, by a transverse common torque shaft 12 located beneath and to the rear of a pilot control column 13 and a co-pilot control column 14. The pilot control column 13 and the co-pilot control column 14 are interconnected and bussed together by a figure eight cable and quadrant assembly, indicated generally by the reference numeral 15.

Control feel and centering

Control feel at the columns 13 and 14 is supplied artificially as a function of air speed and aircraft response. A centering spring device, indicated generally by reference numeral 16, automatically returns the common shaft 12 to center and at the same time provides some feel response at the control columns 13 and 14. The device 16 comprises an helical compression spring 17 encircling and urging outwardly and forwardly a plunger 18 by bearing against a cylindrical disk-shaped head or flange 18a on one end thereof and reacting against a plate 20 fixed to the fuselage of the aircraft, not shown. The plunger 18 extends through a cylindrical sleeve 21 and is guided by the sleeve 21, which is secured in an opening in the air frame plate 20. An opposite end of the plunger 18 has a tapered, spade-shaped, flat plate 18b fixed thereto. Another tapered, spade-shaped flat plate 22 is fixed to and carried by the shaft 12. A pair of parallel cables 23, 24 have the ends thereof respectively connected to the plate 18b and the plate 22. A pair of idler guide pulleys 25 and 26 guide the cables 23, 24 thereon respectively. As the shaft 12 is turned or angularly displaced, the spade 22 is also equiangularly displaced in a single transverse plane thus causing the plunger 18 to be pulled aft through the sleeve 21 and thus tensioning the spring 17 in compression. The spring 17 assists in returning the common shaft 12 to its center position when permitted by the pilot or co-pilot at the control columns 13 and 14.

Control feel Q-spring

As pointed out, control feel is supplied artificially as a function of air speed also by a Q-spring device indicated generally by the reference numeral 30. The Q-spring device 30 comprises a pair of interconnected, contiguous bellows 31 and 32 adapted to expand responsive to dynamic air speed through an inlet 33 and a pair of lines 35 and 36 connected to the bellows 32 and 31 respectively. The inlet 33 may be referred to as a primary Q-pressure inlet. An inlet 37 having a one-way check valve 38 therein is connected into the line 33 and provides a secondary or alternate Q-pressure inlet. The alternate inlet 37 is provided to reduce the possibility of loss of artificial feel caused by blockage of the Q-pressure inlet 33 by the formation of ice. When the inlet 33 is functioning normally, the check valve 38 prevents any contribution from the alternate inlet 37. But if the inlet 33 is so impeded by ice as to let air inlet pressure become abnormally low, the resulting differential pressure across the check valve 38 causes it to open and allow an alternate source of air to be supplied to the Q-spring 30. The alternate source may be from another duct or engine air, or both.

An helical tension spring 39 has one end connected to the bellows 32 and another end connected to a flange 40 fixed to the air frame, not shown. A cable 41 has one end connected to the bellows 31 and another end connected to a spade-shaped plate 42 fixed to the common shaft 12. A pair of idler guide pulleys 43, 44 assist in guiding the cable 41 in its planar path of travel during the operation of the cable tension regulator 30. The cable tension regulator 30 is connected to the shaft 12 near the mid-point thereof with the feel and centering spring device 16 connected to the shaft 12 on the starboard side thereof. It will be apparent from this description that the control feel introduced by the regulator 30 will be stiffer at lower speeds than at higher speeds. This regulator 30 is provided to compensate for normal increased stiffness in the controls at higher speeds and elevator movements due to increased air mass flow. Accordingly, due to the composite action of air speed and the Q-spring, control feel is made substantially uniform at all air speeds.

Autopilot input

An autopilot servo motor pitch control input arrangement is indicated generally by reference numeral 45 and comprises a cable quadrant or sector 46 fixed to the shaft 12 on the port side of the cable tension regulator 30. The cable 47 is looped over one end of a pulley 48 fixed to and driven by a drive shaft of an autopilot output servo motor 49. The two ends of the cable 47 are respectively fixed to a pair of sectors 46a and 47a of the cable quadrant 46.

Pilot and co-pilot control columns

Aside from the autopilot input, the shaft 12 is operated by movement of the pilot and co-pilot control columns 13 and 14 through the control buss 15. The control buss 15 is comprised of a pair of laterally spaced conventional adjustable cable tension regulator quadrants 50 and 51 respectively fixed to the port and starboard ends of the shaft 12. The quadrants 50 and 51 are preferably driven by cables 52 and 53. The cables 52 and 53 have midportions looped around pulleys 54, 55, respectively, and the ends fastened to corresponding portions of the quadrants 50 and 51.

More particularly, the cable 52 has one end fixed to a sector 51a of the quadrant 51, extended around the pulley 55, extended a quarter of the way around a starboard buss pulley 56, crossed over the cable 53, extended a quarter of the way around a buss pulley 57 and has the other end fixed to a sector 50a of the quadrant 50. The other cable 53 has one end fixed around a sector 51b of the quadrant 51, extended a quarter of the way around the pulley 56, crossed over the cable 52, extended a quarter of the way around the pulley 57, extended halfway around the pulley 54, and has the other end fixed to a sector 50b of the quadrant 50. Preferably, idler pulleys 58 and 59 are respectively guided on the cables 52 and 53. The pulleys 58 and 59 are connected to the air frame and may be made movable for adjusting the tension of the cables 52 and 53.

Preferably, the pulleys 56 and 57 each comprise two diametrically opposite integrally connected sectors 56a, 56b and 57a, 57b and a single sector 56c, 57c respectively disposed between the two conjoint sectors 56a, 56b and 57a, 57b with a diametrically extending pulley actuating arm 56d, 57d, respectively.

Preferably, the actuating arm 57d is operated by a push-pull rod 60. The rod 60 has one end pivotally connected by a pin 61 to the arm 57d, and has the other end pivotally connected by a pin 62 to a crank 63. The crank 63 is fixed to a shaft 64 to which the pilot control column 13 has been fixed. Movement of the column 13 fore and aft will drive the rod 60 aft and fore for respectively lowering and raising both of the elevators 10 and 11. Although the control column 13 has been shown with a steering wheel 13a, no yaw and roll control systems have been shown with this invention. This is also true of a steering wheel 14a on the co-pilot control column 14.

A co-pilot operated push-pull rod 65 has an aft end pivotally connected by a pin 66 to the lever 56d. The fore end of the rod 65 is pivotally connected by a pin 67 to a crank 68 fixed to a shaft 70. The co-pilot control column 14 has its lower end fixed to the same shaft 70.

Control feel "g" compensating and damping

A bobweight 71, a viscous damper 72, and a bobweight balance spring 73 are located forward of and below the co-pilot's control column 14 near the center of the airplane. These components 71, 72, 73 are part of the artificial feel "g" compensating and damping system and are connected by a bellcrank 74 and a link 75 to the co-pilot's forward cable quadrant 56 via the crank 68 and the rod 65. The link 75 is pivotally connected to the bellcrank 74 and the crank 68 by pivot pins 76 and 77, respectively.

The bobweight 71 comprises a mass mounted on a crank arm 78 of the viscous damper 72. The bobweight balance spring 73 has one end fixed to the air frame and the other end connected to and supporting the bobweight 71.

During unaccelerated, straight and level flight the bobweight 71 is balanced by the bobweight balance spring 73 so that no feel force is produced thereby at the control columns 13 and 14. The bobweight 71 is free to rotate such that it produces a predetermined restoring column force when a change to aircraft normal acceleration of, for example, one "g" increment is induced. The build-up of normal acceleration can be expected to lag control column displacement.

Two things have been done to eliminate undesirable feel characteristics caused by a delay in aircraft response. The bobweight 71 is located in the forward end of the aircraft so that a restoring column force is generated by the effect of both up or down pitch acceleration on the bobweight 71. The viscous damper 72 produces a column force which opposes column displacement as a function of displacement rate. These two feel force sources are transient and occur only in the time period when column displacement leads the build-up of normal acceleration.

The composite effect of all the artificial feel force producing elements 16, 30, 71 and 72 provides a requirement that a pilot, in order to pull one "g" increment in various flight situations within an operational envelope for the maneuver, exerts a column force per "g" varying from thirty-eight pounds to ninety-four pounds, preferably. The column force requirement depends upon the column length and linkages, gross weight, center of gravity location, and air speed.

Since a portion of the total feel force is generated by the bobweight 71, the Q-spring 30 and the centering spring 16 can be sized smaller resulting in less variance in total column force per "g."

If the feel system consisted only of a Q-spring 30 and the centering spring 16 and were sized to require a column force of forty pounds for 1.4 degrees elevation deflection condition at a given air speed gross weight, and center of gravity location; it follows that a column force of $$\frac{7.4°}{1.4°} \times 40 \text{ lbs.} = 210 \text{ lbs.}$$

would be required for 7.4 degrees deflection of the elevator. This is true because the combined effect of both of these feel forces produces a force proportional to elevator deflection. The force produced by the bobweight 71 is a reaction to aircraft response and it is therefore unaffected by gross weight, center of gravity location, and air speed.

This primary pitch axis control system comprises a mechanical linkage controlling hydraulically powered double-acting fluid motor actuators 80 and 81, which drive tab-boosted elevators 82 and 83 respectively. The elevators 82 and 83 respectively carry aerodynamic boost tabs 84 and 85, FIG. 1. Secondary pitch axis control is preferably obtained through variable incidence interconnected horizontal stabilizers 86 and 87 controlled in a conventional manner, not shown.

An aft quadrant control arm 50c is connected by a conventional linkage 88 to a servo valve metering pin actuating lever 90 within the stabilizer 86 inboard of the tips thereof for controlling the actuator 80. Another aft quadrant control arm 51c is connected by a conventional linkage 89 to a servo valve metering pin actuating lever 91 within the stabilizer 86 inboard of the tips thereof for controlling the actuator 81. More particularly, the control arm 50c has an outer end pivotally connected to a push-pull rod 92 by a pin 93. The rod 92 transmits motion via the linkage 88 to a push-pull rod 97. An aft end of the rod 97 is connected by a pin 100 to the actuator lever 90.

Similarly, the control arm 51c has an outer end pivotally connected to a push-pull rod 102 by a pin 103. An end of the rod 102 is connected to the linkage 89 for transmitting motion from the rod 102 to a push-pull rod 107. An aft end of the rod 107 is pivotally connected by a pin 108 to the actuator lever 91.

The elevator pitch control means 10 and 11 are similar. Accordingly, only the assembly 10 need be described in great detail herein. The assembly 10 comprises the actuator 80, the elevator 82, the elevator boost tab 84 and a double-acting spring cartridge assembly 110 connected to and carried by the port trailing edge of the stabilizer 86. The assembly 11 comprises the actuator 81, the elevator 83, the elevator boost tab 85, and a spring cartridge assembly 111.

It is seen from the drawings that positive coordination of metering pins 90, 91 positions in the left and right actuators 80 and 81, respectively, is provided by the control linkage which is bussed together in the fuselage, FIG. 1. It is also noteworthy that no other physical interconnection between the elevators 82 and 83 is provided. The actuator 80 is located preferably approximately one-third of the span from the inboard end of the elevator 82. The actuator 80 has an end of a piston rod 121 pivotally connected by a pin 122 to a support bracket 123 fixed to the stabilizer 86. A housing body 124 of the actuator 80 is attached to a lever 125 of the elevator 82 by a pin 126. The housing body 124 travels axially along the piston rod 121. When surface movement is commanded by an input to a servo valve, not shown, from the control rod 97 and the lever arm 90, it is the movement of the actuator body 124 that provides servo valve with nulling travel feedback. Accordingly, the need for a separate feedback linkage from the control surface 82 to the servo valve is obviated. Preferably, the servo valve is a tandem spool metering valve which controls the flow of hydraulic fluid of two completely independent hydraulic systems to the actuator body 124. Each of these systems powers one-half of the dual tandem actuator 80 which consists of two pistons mounted and integrally connected to an intermediate portion of the common piston rod 121. Each of the pistons is slidably disposed and acts within a separate cylinder formed in the common actuator housing body 124. The pistons are designed to restrict the flow of fluid from the piston cylinders, respectively, at the extremes of piston travel. This feature provides gust damping protection to the control system and obviates any need for a separate gust damping device. A suitable hydraulic actuating device is disclosed in copending U.S. patent application Serial Number 418,137, filed Dec. 14, 1964, and entitled, "Aircraft Control System," by Thomas M. Gleason and Lloyd G. Peck.

The elevator 82 is pivoted about a transverse, substantially horizontal pivot axis defined by a rod 127. Movement or deflection of the elevator 82 away from its central neutral position, as shown in solid outline in FIG. 2, into or towards a deflected position, as shown in hidden outlines in FIG. 2, requires a considerable amount of force on the lever 125 particularly in the face of a high mass ambient air flow condition, such as at high speeds and low altitudes with an aircraft that could weigh as much as 250 tons.

Accordingly, a novel feature of this invention involves the use of the boost tab 84 for boosting the elevator 82 and assisting the force applied to the lever 125 when the elevator 82 is between the neutral position and either of its extreme up and down positions, which for purposes of illustrating the best mode of carrying out the invention is twenty degrees deflection.

The elevator boost system comprises a rocker arm 128 connected to the elevator rod 127 and turnable thereon. One end of the rocker arm 128 is connected to the boost tab 84 by two push rods 130 and 131. One end of the push rod 130 is pivotally connected to the rocker arm 128 by a pivot pin 132. The other end of the push rod 130 is pivotally connected by a pin 133, FIG. 3, to a T-shaped swivel arm 134. The arm 134 has its main leg pivotally connected to a flange 135 by a pin 136. The flange 135 is fixed to a vertical planar rib 82a of the elevator 82. The rib 82a preferably has lite hole 82b and 82c formed therein. More particularly, the flange 135 is triangularly-shaped projecting perpendicularly away from a central portion 82d of the rib 82 and extending longitudinally of the aircraft.

The push rod 131 has one end pivotally connected by a pin 137 to a crank lever 138. The lever 138 is fixed to a leading underside portion of the boost tab 84 and extends radially of a pivot rod 139 of the boost tab 84. The other end of the push rod 131 is pivotally connected by a pin 140 to the arm 134.

The other end of the rocker arm 128 is pivotally connected by a pin 141 to a plunger rod 142 of the double-acting spring cartridge assembly 110, FIG. 4. As shown in FIG. 4, the rod 142 is threaded at the other end thereof into an outer end of a piston assembly comprising a polish rod 143 having a pair of sleeves 144 and 145 biased apart by an helical compression spring 146 in a cylinder 147. The cylinder 147 has a lug 148 fixed to one end thereof connecting the same by a pin 149 to a flange 150. The flange 150 is fixed to a vertical transverse stabilizer wall 86a.

The polish rod 143 has an annular flange 143a formed at its inner end for retaining the sleeve 144 on the rod 143. The sleeve 144 has a cylindrical tube portion 144a and an annular flange portion 144b.

The tube portion 144a slides along the rod 143 while the outer periphery of the flange portion 144b is slidably guided along an interior cylindrical wall portion 147a of the cylinder 147. The wall portion 147a has a larger diameter than a smaller cylindrical wall portion 147b of the cylinder 147 and thereby provides an annular stop portion 147c for the sleeve 144. The sleeve 145 has a cylindrical tube portion 145a and an annular flange portion 145b similar but oppositely disposed to the sleeve 144. The tube portion 145a slides along the rod 143 and the flange portion 145b is slidably guided in the cylindrical portion 147a. A stop nut 152 is threaded over the outer end of the cylinder 147 and has a radially inwardly extending, annular flange 152a forming a stop for the sleeve 145. The polish rod 143 has a stop nut 153 threaded onto the outer end thereof for bearing against the spring-loaded sleeve 145. A lock nut 154 is also threaded onto the polish rod 143 for locking the nut 153 in place.

As seen in FIG. 4, if the piston rod 142 is pushed into the cylinder 147, the spring 146 is compressed by the sleeve 145 moving inwardly and bearing against the sleeve 144 up against the stop portion 147c. If the piston rod 142 is pulled outwardly of the cylinder 147, the sleeve 144 is pulled toward the outer end of the cylinder 147 causing the spring 146 to be compressed and to bias the sleeve 145 against the stop nut 152 fixed to the outer end of the cylinder 147.

In the elevator travel range of fourteen degrees, the spring cartridge 110 acts as a solid link except during high speed travel when aerodynamic forces on the boost tab 84 cause the tab 84 to tend to fair with the elevator 82 by overpowering the spring 146 in the cartridge 110.

At the fourteen degrees travel point, a cam stop slot 82e formed in the forward end of the horn of the elevator 82 contacts a roller 155 journaled by a shaft 156 on a crank arm 157 in the boost tab linkage system. The crank arm 157 is fixed at one end thereof to one end of an arm 158 that is pivotally connected to the rocker arm 128 by a push-pull rod 159. The rod 159 has one end pivotally connected by a pin 160 to one end of the arm 158. The rod 159 has another end pivotally connected by a pin 161 to the rocker arm 128. The rocker arm 128 has a portion 128a bearing the pin 132 and an oppositely extending portion 128b bearing the pin 41. The rocker arm 128 is turnably mounted on the rod 127 between the two portions 128a and 128b. A third portion 128c bearing the pin 161 extends from and is connected to the portion 128b at a leading edge thereof.

The slot 82e comprises a midportion formed forwardly of the rod 127. The slot 82e terminates in radially extending end walls or stops 82f and 82g at the ends thereof. The length of the arc between the stops 82f and 82g is twenty-eight degrees.

The wheel 156 of the boost tab linkage bears against the stop 82f or 82g and fairs the tab 84 as the elevator 82 travels from fourteen degrees to twenty degrees by exerting a force on the tab linkage that exceeds the preload force of the spring cartridge 110. This causes the cartridge 110 to change length which in turn allows the tab 84 to take the position dictated by the cam stop 82f or 82g. This schedule of tab position programming provides for minimized actuator loads in the travel range required for high speed flight and yet restores maximum elevator effectiveness in the travel range which is utilized during low speed flight. It also makes elevator hinge moment forces compatible with the requirements of manual reversion in the range of elevator travel and air speed associated with landing of the aircraft.

Inasmuch as the pilot moves the elevators 82 and 83 by positioning the metering pins 90 and 91 of the hydraulic actuators 80 and 81 controlling the position of the elevators 82 and 83, the pilot is not required to react the aerodynamic forces resulting from deflection of the elevators 82 and 83. This usual source of control feel is therefore not present. The control feel must then be artificially generated. The artificial feel system embodying this invention comprises the pre-loaded centering spring device 16, the Q-spring device 30, the bobweight 71, the viscous damper 72, and the bobweight balance spring 73. The combined action of these devices minimizes the variation of column force per "g," i.e. incremental change in normal acceleration, caused by variations in gross weight, location of center of gravity C.G., and air speed of the aircraft. Moreover, it is preferred to limit feel forces to a practical minimum to reduce pilot fatigue.

It will be understood that this invention can be modified to adapt it to various circumstances and conditions, and it is accordingly desired to comprehend within the purview of this invention such modifications as may be considered to fall within the scope of the appended claims.

What is claimed is:

1. In an aircraft pitch control system, an airframe, a horizontal stabilizer connected to the airframe, at least one elevator pivotally connected to the trailing edge of said stabilizer, control column means mounted for pivotal movement on a shaft and having a downwardly depending crank for pivotable movement therewith, linkage means connecting said control column means to said elevator for causing the pivoting of said elevator about a pivot axis relative to said stabilizer, said linkage means including a torque shaft, a first pulley and a second pulley fixed to said torque shaft, a third pulley spaced forwardly of said torque shaft, a fourth pulley spaced from said third pulley and said torque shaft, a first segment of cable having one end fixed to a point on said first pulley respectively extending partially around and guided on said third pulley and said fourth pulley and having another end fixed to a point on said second pulley corresponding to said point on said first pulley, a second cable segment having one end fixed to a point on said first cable opposite to said one end of said first cable segment and respectively extending partially around and guided on said third pulley and said fourth pulley in such a manner as to cross said third pulley segment between said third pulley and said fourth pulley and having another end fixed to a point on said second pulley opposite to said another end of said first cable segment, said linkage means having a push-pull rod pivotally connected to said first pulley and to said crank, said third pulley turning in a clockwise direction when said fourth pulley is turned in a counterclockwise direction, means in said linkage means disposed between and connected to said elevator and to said torque shaft for effectively isolating said control column means and preventing control feel feedback forces from flowing from said elevator to said control column means, first artificial control feel force means disposed forwardly of and connected to said torque shaft for acting on said control column means for biasing said control column means toward a centered neutral pitch control position and for resisting movement of said control column means with increasing force as said control column means is displaced away from said centered position, and second artificial control feel force means connected to said torque shaft for acting on said control column means for resisting movement of said control column means away from said centered position with increasing force as a function of increasing airspeed of the aircraft.

2. In an aircraft control system, an airframe, at least one control surface movably connected to said airframe, control means having a torque shaft, linkage means connecting said control means to said control surface for controlling the movement of the same, means in said linkage means effectively isolating said control means and preventing control feel feedback forces from flowing from said control surface to said control means, first artificial control feel force means acting directly on said torque shaft of said control means for biasing said torque shaft toward a centered neutral control position and for resisting angular movement of said torque shaft with increasing force as said torque shaft is displaced away from said centered position, and second artificial control feel force means acting directly on said torque shaft of said control means for resisting movement of said torque shaft away from said centered position with increasing force as a function of increasing airspeed of the aircraft, and said first and second artificial feel force means acting on said torque shaft being additive and increasing as a sine of the angle of displacement of said torque shaft from said centered neutral control position.

3. In an aircraft control system as set forth in claim 1, third artificial control feel force means having a bobweight resiliently suspended by a tension spring fixed to the aircraft above said bobweight and disposed forwardly of and connected to said crank for acting on said control means for automatically generating restoration forces proportional to acceleration caused by deviation from level and even velocity flight of said aircraft about an axis thereof and directing said restoration forces against said control means until level and even velocity flight is resumed and said control means returns to said centered position.

4. In an aircraft control system as set forth in claim 3, fourth artificial control feel force means connected to and interposed between said control means and said third artificial control feel force means comprising vibration isolator and damping means.

5. In an aircraft pitch control system as set forth in claim 1, wherein said second artificial control feel force means acting on said control column means for resisting movement of said control column means away from said centered position with increasing force as a function of increasing airspeed of the aircraft comprises a Q-spring device.

6. In an aircraft pitch control system as set forth in claim 1, wherein said first artificial control feel force means acting on said control column means for biasing said control column means toward said centered position and for resisting movement of said control column means with increasing force as said control column means is displaced away from said centered position comprises, a first plate fixed to said torque shaft, a second plate, two parallel guide cables connecting said first plate to said second plate, and spring means resiliently biasing said plates apart in such a manner as to keep said two parallel cables taut.

References Cited by the Examiner
UNITED STATES PATENTS

| | | | |
|---|---|---|---|
| 2,557,426 | 6/1951 | George | 244—82 |
| 2,684,215 | 7/1954 | Ashkenas | 244—83 |
| 2,955,784 | 10/1960 | Vagel et al. | 244—83 |
| 3,000,595 | 9/1961 | Dorn | 244—82 |
| 3,002,714 | 10/1961 | Decker | 244—83 |

MILTON BUCHLER, *Primary Examiner.*

ANDREW H. FARRELL, *Examiner.*